Nov. 21, 1944. R. B. COTTRELL 2,362,989
CAR TRUCK
Filed Dec. 13, 1941 3 Sheets-Sheet 1

INVENTOR.
Robert B. Cottrell
BY
ATTORNEY:

Nov. 21, 1944.   R. B. COTTRELL   2,362,989
CAR TRUCK
Filed Dec. 13, 1941   3 Sheets-Sheet 2
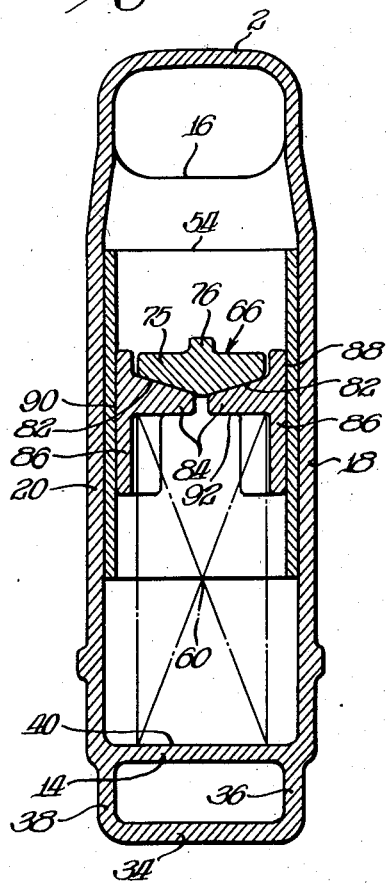
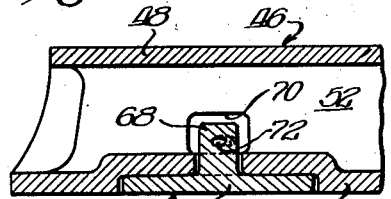
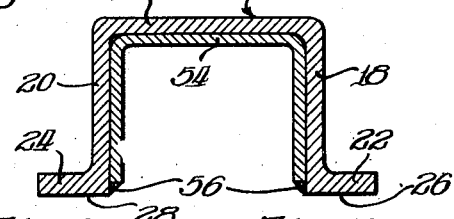
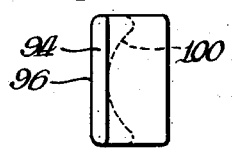
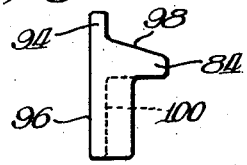
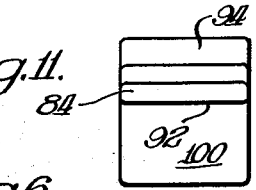
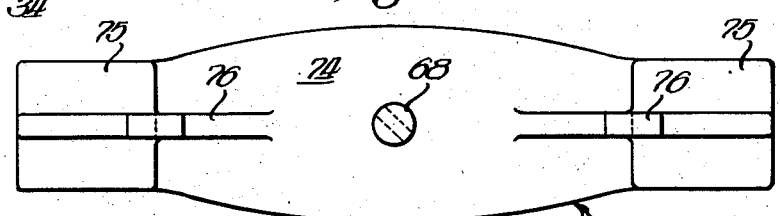
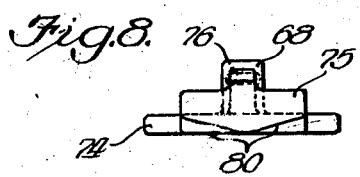
INVENTOR.
Robert B. Cottrell
BY
ATTORNEY Nov. 21, 1944.   R. B. COTTRELL   2,362,989
CAR TRUCK
Filed Dec. 13, 1941   3 Sheets-Sheet 3
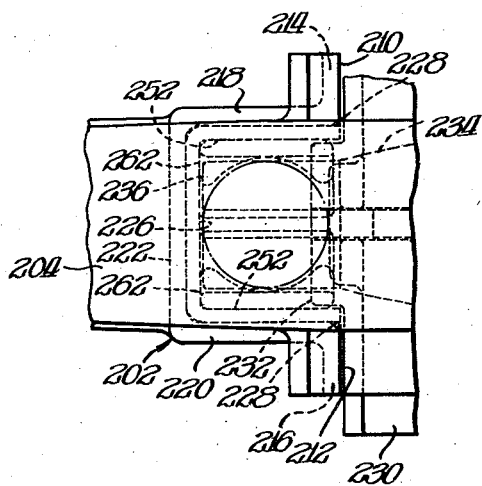
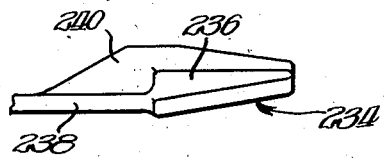
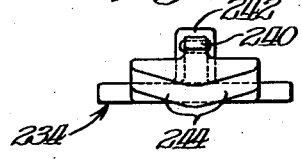
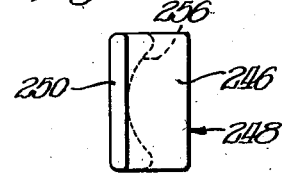
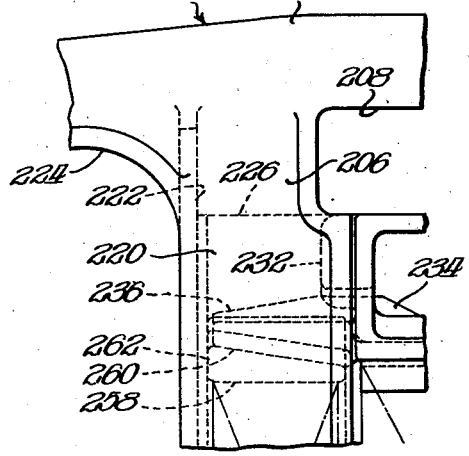
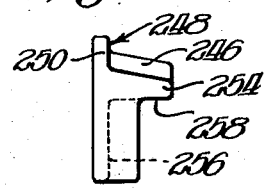
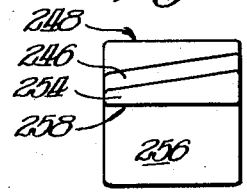
INVENTOR.
Robert B. Cottrell
BY
ATTORNEY:

Patented Nov. 21, 1944

2,362,989

UNITED STATES PATENT OFFICE 2,362,989

CAR TRUCK

Robert B. Cottrell, Chicago, Ill., assignor to American Steel Foundries, Chicago, Ill., a corporation of New Jersey Application December 13, 1941, Serial No. 422,804

31 Claims. (Cl. 105—197)

My invention relates to railway freight car trucks and particularly to an improvement in a well-known form of four wheel freight car truck which comprises spaced truss type side frames, a connecting bolster, and an interlocking member at each end of the bolster serving to tie the bolster and side frame together.

The general object of my invention is to devise a four wheel freight car truck of the above-mentioned general design wherein the interlocking member which ties together the side frame and bolster may serve also as a means of actuating a friction device or snubbing means associated with the car truck.

A particular object of my invention is to devise such a car truck as that described wherein the bolster and side frame interlocking member may be formed with end portions with diagonally arranged surfaces for abutment with complementary surfaces of friction shoes which may be mounted in the respective columns of each side frame in such manner as to afford frictional engagement with certain walls of said columns.

A different object of my invention is to devise a freight car truck comprising spaced side frames, a bolster, and interlocking members wherein the interlocking members may have end portions extending into the columns of the side frame for actuation of friction shoes resiliently mounted therein, the engagement of said interlocking member end portions with each friction shoe being such as to urge the shoe into frictional engagement with a plurality of friction walls afforded on the adjacent column.

A more specific object of my invention is to devise such a freight car truck as that described wherein each end portion of the interlocking member may be afforded reversely arranged diagonal friction faces for engagement respectively with complementary faces of friction shoes and wherein said friction faces may have taper in two directions, that is, both longitudinally and transversely of the truck so that the engagement of the interlocking member with the shoes will be effective to urge the shoes apart and at the same time to urge each shoe into engagement with a plurality of friction walls afforded on the adjacent side frame column.

My invention comprehends such an arrangement as that described wherein the side frame tension member beneath the bolster opening may be of box-section with a widened top chord formed with upstanding flanges defining a spring seat substantially as described in my Patent No. 2,220,218, issued by the United States Patent Office November 5, 1940, and wherein the upstanding flanges of said tension member converge to merge with the side walls of the columns at opposite sides of the bolster opening, said structure permitting a relatively low spring seat on said tension member and thereby accommodating, within present standard side frame heights, a longer travel spring for support of the superposed bolster.

Yet another object of my invention is to devise a railway freight car truck utilizing relatively long travel bolster supporting springs, certain of which springs may be positioned directly under the bolster end and other of which may be positioned under the friction means actuated by the bolster interlocking member, said springs associated with the friction shoes and having a length approximately equal to that of the springs directly supporting the bolster.

Figure 3 is a sectional view in the transverse vertical plane approximately as indicated by the line 3—3 of Figure 1, the section being taken through the columns and the friction device supported therein.

Figure 4 is a fragmentary sectional view taken in the transverse vertical plane bisecting the truck and as indicated by the line 4—4 of Figure 1.

Figure 5 is a further fragmentary sectional view taken in the transverse horizontal plane substantially as indicated by the line 5—5 of Figure 1.

Figures 6, 7, and 8 show one embodiment of my novel form of bolster and side frame interlocking member, Figure 6 being a top plan view thereof, Figure 7 a side elevation, and Figure 8 an end view.

Figures 9, 10, and 11 show my novel form of friction shoe in one embodiment, Figure 9 being a top plan view thereof, Figure 10 a side elevation, and Figure 11 a front elevation.

Figure 2:
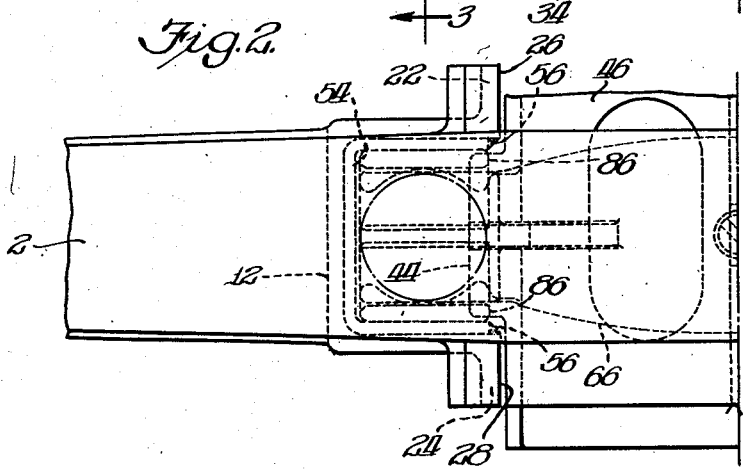
Figure 2 is a fragmentary top plan view of the truck structure shown in Figure 1.

Figure 12 is a fragmentary top plan view comparable to the view of Figure 2 showing a further embodiment of my invention.

Figure 1:
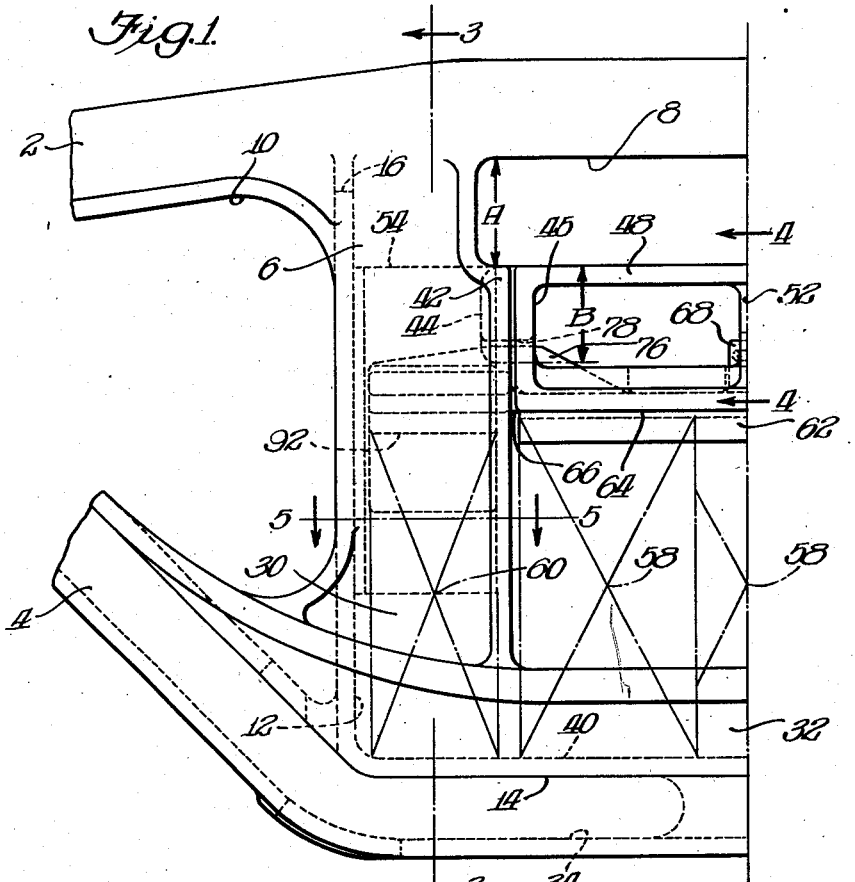
Figure 1 is a fragmentary side elevation of a railway car truck embodying my invention, only one end of the truck structure being shown as the arrangement is identical at opposite ends thereof.

Figure 13 is a fragmentary side elevation comparable to the view of Figure 1 further illustrating the embodiment shown in Figure 12.

Figures 14 and 15 are views of a further embodiment of my novel form of interlocking member, Figure 14 being a fragmentary side elevation, and Figure 15 an end view thereof.

Figures 16, 17, and 18 show my novel form of friction shoe as utilized in the embodiment of my invention as illustrated in Figures 12 and 13.

Describing the structures in detail, my novel truck comprises spaced identical side frames each including a compression member 2, a tension member 4, and a column 6 at each side of the frame defining therewith a central bolster opening 8 and a window opening 10 adjacent each end of the frame. Each column 6 may have a U-section, the transverse web 12 of which may extend vertically upward from the top web 14 of the tension member to adjacent the top of the bolster opening as indicated at 16 (Figure 3) and the said column may comprise also an inboard wall 18 (Figure 5) and an outboard wall 20, each of which may be flanged at the bolster opening edge as at 22 and 24 to afford inboard and outboard bolster guide surfaces 26 and 28. Each inboard and outboard wall of the column may merge adjacent its lower end as at 30 with the converging end portion of the upstanding flange 32 at the adjacent side of the tension member, said tension member comprising also the bottom web 34 as well as the inboard and outboard walls 36 and 38, the structure of said tension member being substantially that described in detail in my above-mentioned Patent No. 2,220,218. The spring seat 40 on the top of the tension member at the bottom of the bolster opening thus is protected at each side by the upstanding flange 32 and said spring seat extends longitudinally of the frame the full distance between the upright webs 12, 12 of the respective columns so that said spring seat may have relatively great length and afford seating for the springs within the columns as well as between the columns on a single level. The bolster guide surfaces 26 and 28 may extend from the junctures of said columns with the tension member vertically upwardly to the shoulder or offset portion 42 (Figure 1), said shoulder defining a widened portion of the bolster opening and said widened portion having a depth A slightly greater than the height B of the guide lug 44 to permit application or removal therethrough, said guide lug being formed on the adjacent side wall 45 of the bolster generally designated 46, said bolster having a box-section comprising the top wall 48, the bottom wall 50, and the central reinforcing rib 52. Each bolster guide lug may be generally rectangular in form having the depth shown in the view of Figure 1 and the width shown in the view of Figure 2, said width being such as to afford slight clearance of said guide lug between the lateral walls of the U-shaped wear plate 54 which may be welded as at 56, 56 within the adjacent column.

Positioned on the spring seat 40 may be the main bolster supporting springs diagrammatically indicated at 58, 58 and the auxiliary supporting springs diagrammatically indicated at 60, said main springs being confined at their lower ends by the upstanding flanges of the tension member and at their upper ends by the spring plate 62 upon which the bolster may seat as at 64.

Recessed within the bottom wall 50 of the bolster 46 and extending transversely thereof may be the bolster and side frame interlocking member generally designated 66, said interlocking member having the detailed form best seen from a consideration of the views of Figures 6 to 8 inclusive and comprising a central upstanding lug 68 which may extend through the bottom wall 50 of the bolster into the opening 70 cored in the central rib 52 thereof wherein said lug 68 may be keyed in any convenient manner as by a cotter key inserted as at 72. The interlocking member 66 comprises a base plate 74 relatively wide at the central portion thereof which may be defined by oval margins merging with generally rectangular end portions 75, 75 somewhat thicker, the juncture of each end portion with the central plate portion 74 being reinforced by the upstanding flange 76 which may project through the slot 78 in the adjacent side wall and bottom wall of the bolster (Figure 1) as additional means of tying together the bolster and interlocking member. Each end portion 75 may present on its bottom surface diverging friction faces 80, 80 (Figure 8) which may have engagement as at 82, 82 with the complementary surfaces formed on the shelf portions 84, 84 of respective friction shoes 86, 86, and said friction shoes may also present friction areas for engagement as at 88 and 90 with adjacent walls of the wear plate 54; said wear plate lining the walls of the adjacent column in manner already described. The friction shoes 86, 86 in each column may be supported by the adjacent auxiliary spring 60, the upper end of which may be afforded a spring seat as at 92 by the shelf portions 84, 84 of one pair of shoes.

The detail of each friction shoe is shown in Figures 9, 10, and 11. It will be noted that each shoe comprises a rectangular friction wall 94 representing over its entire area a flat friction surface 96 for abutment at 90 with the adjacent wear plate 54 as already described, said friction shoe presenting opposite the surface 96 a shelf portion 84 with a diagonally arranged top surface 98 which may engage as at 82 with an adjacent complementary portion of the interlocking member, as already described.

The bottom surfaces of the shelf 84 may define the spring seat 92 and below said shelf 84 the wall 94 may present a concave configuration best seen at 100 in the top plan view of Figure 9, said configuration serving to confine and properly position the auxiliary spring 60 between adjacent shoes.

The modification illustrated in Figures 12 and 13 is substantially identical to that just described as far as the general truck structure is concerned and the views are fragmentary and designed only to illustrate the differences between this modification and that previously described. As illustrated, the side frame generally designated 202 comprises the tension member 204 and the column 206 defining therewith the bolster opening 208, said bolster opening having at the top a widened portion of restricted depth as described for the previous modification and below said widened portion may present the outboard and inboard bolster guide surfaces 210 and 212 formed on the flanges 214 and 216 of the respective side walls 218 and 220 of the column 206, said column 206 being of U-section and also comprising the transverse web 222 adjacent the window opening 224. The column may be lined by the wear plate 226 in manner identical to that described for the previous modification, said wear plate being secured as by welding at 228, 228 to the respective side walls of the column. In this modification the bolster 230 is identical with the bolster of the previous modification, the side wall of said bolster having guiding engagement against the surfaces 210 and 212 and presenting therebetween a rectangular lug 232 of such depth as to admit it in the widened portion at the top of the bolster opening.

In this modification, the bolster and side frame interlocking member 234 is interlocked with the bolster in identical manner with that of the previous modification, said interlocking member being modified, however, with respect to each rectangular end portion 236 thereof. The structure of the end portion is shown in detail in Figures 14 and 15 wherein it may be noted the interlocking member 234 may have a base plate 238 merging with the rectangular end portion 236, the juncture thereof being reinforced by the vertical rib 240 which, together with the central lug 242, may serve as means of tying said interlocking member to the associated bolster. In this modification each end portion 236 presents on its lower side a plurality of diagonally arranged friction faces 244, 244 which may seat against complementary surfaces 246, 246 formed on the respective friction shoes 248, 248, said friction shoes being generally similar to those described for the previous modification except for the arrangement of the friction surfaces 246 and including the vertical friction wall 250 which may seat against an adjacent lateral wall of the column as at 252 (Figure 12) in like manner with the previous modification. The shoe structure may also include the shelf portion 254 and below said shelf portion one side of the wall 250 may present the concave face 256 as positioning means for the adjacent spring which may seat against the bottom of the shelf 254 on the seat provided at 258.

In this modification it should be noted that the complementary friction surfaces 244 and 246 on the end of the interlocking member and the friction shoes taper in two directions, that is, not only laterally of the truck but longitudinally thereof as may be seen at 260 (Figure 13) so that each friction shoe 248 is urged into engagement against the wear plate 226 not only at 252, 252 toward the lateral walls of the columns, but also said shoes are urged into engagement with said wear plate longitudinally of the truck to afford frictional seating against the transverse portion of said wear plate as at 262 (Figure 12) and thus each friction shoe is in a manner urged into one corner of the column and has frictional engagement against two surfaces thereon substantially at right angles to each other.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck of quick wheel change type, a side frame having tension and compression members and spaced columns defining a central bolster opening and spaced window openings, said tension member having a box-section beneath said bolster opening with a widened top chord and upstanding flanges defining a spring seat, each of said columns having a U-section with inboard and outboard walls and a transverse web defining one margin of the adjacent window opening and defining one end of said spring seat, relatively long travel springs on said spring seat, a bolster seated on certain of said springs in said bolster opening, and an interlocking member recessed in the bottom of said bolster and presenting end portions for actuation of friction means in respective columns, each of said friction means comprising spaced friction shoes abutting respective walls of the adjacent column and presenting spring seats for abutment with certain of said springs, said friction shoes having reversely arranged tapering friction surfaces in engagement with complementary surfaces on the adjacent end portions, each of said columns presenting along intermediate portions thereof spaced bolster guide surfaces terminating at their upper ends at shoulders on said columns defining a relatively widened portion of said bolster opening, said bolster having guide lugs at opposite sides thereof of a height less than the depth of said widened portion of said bolster opening, said guide lugs being receivable between the guide portions on adjacent columns.

2. In a railway car truck of quick wheel change type, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices supported on other of said springs, said bolster presenting at opposite sides thereof guide pads receivable between the guide surfaces of respective columns and each of said guide pads having a height less than the depth of the widened portion of said bolster opening to permit assembling or dismantling of said bolster in said opening while said springs and interlocking member remain in normal assembled relationship.

3. In a railway car truck of quick wheel change type, a truss side frame having tension and compression members and spaced columns defining a bolster opening, each of said columns having a U-section with inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for support on other of said springs, said bolster presenting at opposite sides thereof of guide pads receivable between the guide surfaces of respective columns and each of said guide pads having a height less than the depth of the widened portion of said bolster opening to permit assembling or dismantling of said bolster in said opening while said springs and interlocking member remain in normal assembled relationship.

4. In a railway car truck, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices including shoes supported on other of said springs, each of said friction shoes having complementary face engagement with the adjacent end portion of said interlocking member, said member being operative to urge both of said shoes into engagement with the web of said column and each of said shoes into engagement with one wall thereof.

5. In a railway car truck of quick wheel change type, a side frame having tension and compression members and spaced columns defining a central bolster opening and spaced window openings, said tension member having a box-section beneath said bolster opening with a widened top chord and upstanding flanges defining a spring seat, each of said columns having a U-section with inboard and outboard walls and a transverse web defining one margin of the adjacent window opening and defining one end of said spring seat, relatively long travel springs on said spring seat, a bolster seated on certain of said springs in said bolster opening, and an interlocking member recessed in the bottom of said bolster and presenting end portions for actuation of friction means in respective columns, each of said columns presenting along intermediate portions thereof spaced bolster guide surfaces terminating at their upper ends at shoulders on said columns defining a relatively widened portion of said bolster opening, said bolster having guide lugs at opposite sides thereof of a height less than the depth of said widened portion of said bolster opening, each guide lug being receivable between the guide portions on the adjacent column.

6. In a railway car truck, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices including shoes supported on other of said springs, each of said friction shoes having complementary face engagement with the adjacent end portion of said interlocking member, said member being operative to urge said friction shoes apart and into engagement with spaced walls of the adjacent column, and into engagement with said transverse web.

7. In a railway car truck of quick wheel change type, a truss side frame having tension and compression members and spaced columns defining a bolster opening, each of said columns having a U-section with inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices including shoes supported on other of said springs, each of said friction shoes having complementary face engagement with the adjacent end portion of said interlocking member, said member being effective to urge said shoes apart and to urge each of said shoes into engagement with the web of said column and one wall thereof.

8. In a railway car truck, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices supported on other of said springs, each of said friction devices comprising spaced friction shoes having diagonal face engagement with the adjacent end portion of said interlocking member, and urged thereby into engagement with the wear plates on said transverse web and one of said walls of the adjacent column.

9. In a railway car truck, a side frame having tension and compression members and spaced columns defining a central bolster opening and spaced window openings, said tension member having a box-section beneath said bolster opening with a widened top chord and upstanding flanges defining a spring seat, each of said columns having inboard and outboard walls and a transverse web, relatively long travel springs on said spring seat, a bolster seated on certain of said springs in said bolster opening, and an interlocking member recessed in the bottom of said bolster and presenting end portions for actuation of friction means in respective columns, each of said friction means comprising spaced friction shoes abutting respective walls of the adjacent column and presenting spring seats for abutment with certain of said springs, said friction shoes having reversely arranged tapering friction surfaces in engagement with complementary surfaces on the adjacent end portions.

10. In a railway car truck, a side frame having top and bottom members and spaced columns defining a bolster opening, each of said columns having a U-section with inboard and outboard walls and a transverse web defining the margin of an adjacent window opening, a spring seat on said tension member extending between the webs of said columns, springs on said spring seat, a bolster extending into said bolster opening and seated on certain of said springs, and a member interlocked with said bolster and having end portions extending within said columns for actuation of friction devices therein, each of said friction devices being supported on other of said springs and comprising spaced friction shoes having diagonal face engagement with the adjacent end portions, the engagement of said end portion with said friction shoes being operative to urge both of said shoes into frictional engagement with the web of the adjacent column and each of said shoes into engagement with one wall thereof.

11. In a railway car truck, a side frame having top and bottom members and spaced columns defining a bolster opening, each of said columns having inboard and outboard walls and a transverse web, a spring seat on said tension member extending between the webs of said columns, springs on said spring seat, a bolster extending into said bolster opening and seated on certain of said springs, and a member interlocked with said bolster and having end portions extending within said columns, each of said columns presenting inboard and outboard bolster guide surfaces terminating short of said compression member to define therewith a widened portion of said bolster opening, said bolster presenting guide lugs at opposite sides thereof receivable between the guide surfaces of respective columns, each of said lugs having a height less than the depth of said widened portion.

12. In a railway car truck, a side frame having top and bottom members and spaced columns defining a bolster opening, each of said columns having a U-section with inboard and outboard walls and a transverse web defining the margin of an adjacent window opening, a spring seat on said tension member extending between the webs of said columns, springs on said spring seat, a bolster extending into said bolster opening and seated on certain of said springs, and a member interlocked with said bolster and having end portions extending within said columns for actuation of friction devices therein, each of said friction devices being supported on other of said springs and comprising spaced friction shoes having diagonal face engagement with the adjacent end portion, the engagement of said end portion with said friction shoes being operative to urge each of said shoes into engagement with a wall and a web of the adjacent column.

13. In a railway car truck, a side frame having top and bottom members and spaced columns defining a bolster opening, each of said columns having inboard and outboard walls and a transverse web, a spring seat on said tension member extending between the webs of said columns, springs on said spring seat, a bolster extending into said bolster opening and seated on certain of said springs, and a member interlocked with said bolster and having end portions extending within said columns for actuation of friction devices therein, each of said friction devices being supported on other of said springs and comprising spaced friction shoes having diagonal face engagement with the adjacent end portion, the engagement of said end portion with said friction shoes being operative to urge said friction shoes apart and into engagement with opposite corners of the adjacent column.

14. In a railway car truck, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for support on other of said springs, damping means associated with each of said other springs comprising a pair of friction shoes seated thereon in engagement with an adjacent end of said interlocking member, said interlocking member being operative to urge each of said shoes into frictional engagement with said wear plates on said web and on one of said walls.

15. In a railway car truck, a truss side frame having tension and compression members and spaced columns defining a bolster opening, each of said columns having inboard and outboard walls and a transverse web, wear plates on the inner faces of said walls and webs, each of said columns having inboard and outboard flanges defining bolster guide surfaces and terminating short of said compression member to define therewith a widened portion of said bolster opening, said tension member having a box-section beneath said bolster opening with a widened top chord and upstanding flanges defining a spring seat extending between the webs of said columns, springs on said spring seat, a bolster seated on certain of said springs in engagement with said guide surfaces, and a member interlocked with said bolster and having end portions extending into said columns for actuation of friction devices supported on other of said springs, each of said friction devices comprising a shoe engaging the wear plates on said transverse web and one of said walls of the adjacent column.

16. In a railway car truck, a side frame having top and bottom members and spaced columns defining a bolster opening, each of said columns having a U-section with inboard and outboard walls and a transverse web defining the margin of an adjacent window opening, a spring seat on said tension member extending between the webs of said columns, springs on said spring seat, a bolster extending into said bolster opening and seated on certain of said springs, and a member interlocked with said bolster and having end portions extending within said columns for actuation of friction devices therein, each of said friction devices being supported on other of said springs and comprising spaced friction shoes having diagonal face engagement with the adjacent end portion, each of said shoes having frictional engagement with a wall and a web of the adjacent column.

17. In a railway car truck, a side frame having tension and compression members and spaced columns defining a central bolster opening and spaced window openings, said tension member having a box-section beneath said bolster opening with a widened top chord and upstanding flanges defining a spring seat, each of said columns having inboard and outboard walls and a transverse web, relatively long travel springs on said spring seat, a bolster seated on certain of said springs in said bolster opening, and an interlocking member recessed in the bottom of said bolster and presenting end portions for actuation of friction means in respective columns, each of said friction means comprising shoe means in frictional engagement with said web and one of said walls.

18. In a railway car truck, a side frame having top and bottom members and spaced columns defining a central bolster opening and a spaced window opening, each of said columns having inboard and outboard walls and a transverse web extending vertically between said members, a one-level spring seat on said tension member, springs thereon, a bolster supported on certain of said springs in guiding engagement with spaced surfaces on each of said columns, and a member interlocked with said bolster and having rectangular end portions guidably received within said columns and operative to actuate friction devices supported therein upon other of said springs, each of said devices comprising opposed shoes each in frictional engagement with said web and one of said walls.

19. In a railway car truck, a side frame having top and bottom members and spaced columns defining a bolster opening, each of said columns having inboard and outboard walls and a transverse web defining the margin of an adjacent window opening, a spring seat on said tension member extending between the webs of said columns, springs on said spring seat, a bolster extending into said bolster opening and seated on certain of said springs, and a member interlocked with said bolster and having end portions extending within said columns for support on other of said springs, friction means interposed between each end portion and the supporting spring and including a friction shoe urged into engagement with said web and one of said walls by said interlocked member.

20. In a railway car truck, a side frame having top and bottom members and spaced columns defining a central bolster opening and a spaced window opening, each of said columns having inboard and outboard walls and a transverse web extending vertically between said members, a one-level spring seat on said tension member, springs thereon, a bolster supported on certain of said springs in guiding engagement with spaced surfaces on each of said columns, and a member interlocked with said bolster and having rectangular end portions guidably received within said columns and supported therewithin on other of said springs, friction means associated with each of said other springs and comprising a friction shoe engaging the adjacent end portion and urged thereby into frictional engagement with said web and one of said walls.

21. In a railway car truck, a side frame having spaced columns, each column including angularly related webs, a bolster spring-supported on said frame between said columns, a member interlocked with said side frame and bolster and extending within said columns for actuation of friction devices spring-supported therein, each of said friction devices comprising a friction shoe in frictional engagement with a plurality of said webs.

22. In a railway car truck, a side frame having spaced columns, each column including angularly related webs, a bolster spring-supported on said frame between said columns, a member interlocked with said side frame and bolster and extending within said columns for actuation of friction devices spring-supported therein, each of said friction devices comprising a plurality of shoes each having frictional engagement with a plurality of said webs.

23. In a railway car truck, a side frame having spaced columns, each column including angularly related webs, a bolster spring-supported on said frame between said columns, a member interlocked with said side frame and bolster and extending within said columns for actuation of friction devices spring-supported therein, each of said friction devices comprising a plurality of shoes, both of said shoes engaging one of said webs and each of said shoes engaging other of said webs respectively.

24. In a railway car truck, a side frame having spaced columns defining a bolster opening, each of said columns comprising a web and walls angularly related with respect thereto, a bolster assembly spring-supported in said opening and including a member interlocking said side frame and bolster, said interlocking member having end portions extending into the adjacent columns for actuation of friction devices therein, each of said friction devices comprising spring-supported friction shoes in operative engagement with the adjacent end portion, said operative engagement being effective to urge said shoes in opposite directions and into frictional engagement with said web and said walls respectively.

25. In a railway car truck, a side frame having spaced columns defining a bolster opening, each of said columns comprising a web and walls angularly related with respect thereto, a bolster assembly spring-supported in said opening and including a member interlocking said side frame and bolster, said interlocking member having end portions extending into the adjacent columns for actuation of friction devices therein, each of said friction devices comprising spring-supported friction shoes in operative engagement with the adjacent end portion, said operative engagement being effective to urge both of said shoes into engagement with said web and one of said shoes into engagement with each of said walls.

26. In combination, a side frame having spaced columns at opposite sides of a bolster opening, each of said columns having a plurality of angularly arranged webs, a bolster assembly spring-supported in said opening and including an interlocking member, said interlocking member having end portions extending into the adjacent columns, damping means in each column in operative engagement with adjacent end portions, each of said damping means comprising a plurality of friction shoes urged in opposite directions by the adjacent end portion, the shoes of each damping means engaging a common web of the adjacent column and respectively engaging spaced webs thereof.

27. In combination, a side frame having spaced columns at opposite sides of a bolster opening, each of said columns comprising a plurality of angularly related webs, a bolster assembly spring-supported in said opening and including an interlocking member with end portions associated with respective columns, damping means spring-supported in each column, each of said damping means comprising a friction shoe in operative engagement with the adjacent end portion, said engagement being effective to urge said shoe into engagement with a plurality of said webs.

28. In combination, a side frame having spaced columns at opposite sides of a bolster opening, each of said columns comprising a plurality of angularly related webs, a bolster assembly spring-supported in said opening and including an interlocking member with end portions associated with respective columns, damping means spring-supported in each column, each of said damping means comprising a plurality of friction shoes in operative engagement with the adjacent end portion, said engagement being effective to urge said shoes oppositely and each into engagement with a plurality of said webs.

29. In a railway car truck, a side frame having a bolster opening with columns at opposite sides thereof, each of said columns having a plurality of angularly related webs, friction means including friction shoes adjacent each of said columns, and means associated with said bolster and operative to urge each of said friction shoes into engagement with a plurality of said webs.

30. In a railway car truck, a supporting member having spaced columns, a supported member in guiding engagement with said columns, an interlocking piece associated with said members having portions extending within said columns for actuation of friction devices therein, each of said friction devices comprising a plurality of shoes frictionally engaging a common wall of the adjacent column and independently engaging spaced walls thereof.

31. A friction device actuator for a railway car truck comprising a central bolster engaging portion, and end portions for actuation of associated friction means, each end portion having a pair of wedge surfaces and each of said surfaces sloping longitudinally and transversely of said actuator.

ROBERT B. COTTRELL.